Sept. 24, 1935.  J. S. MAXWELL  2,015,150
AIRCRAFT
Filed July 25, 1932  7 Sheets-Sheet 1

Inventor
JOHN S. MAXWELL
By A. B. Bowman
Attorney

Sept. 24, 1935. J. S. MAXWELL 2,015,150
AIRCRAFT
Filed July 25, 1932 7 Sheets-Sheet 2

Inventor
JOHN S. MAXWELL
By A. B. Bowman
Attorney

Sept. 24, 1935.   J. S. MAXWELL   2,015,150
AIRCRAFT
Filed July 25, 1932   7 Sheets-Sheet 5

Inventor
JOHN S. MAXWELL
By A. B. Bouman
Attorney

Patented Sept. 24, 1935

2,015,150

UNITED STATES PATENT OFFICE 2,015,150

AIRCRAFT

John S. Maxwell, Fullerton, Calif.

Application July 25, 1932, Serial No. 624,528

18 Claims. (Cl. 244—25)

My invention relates to aircraft, and the objects of my invention are:

First, to provide an aircraft of this class which requires only a minimum amount of space for landing or taking off, there being provided means of maintaining a flow of air over the wings and control surfaces regardless of the forward movement of the aircraft;

Second, to provide an aircraft of this class in which the main wings are tiltable for increasing the lift thereof or for braking purposes when landing;

Third, to provide an aircraft of this class which incorporates a novel landing structure which readily folds into the lower wings but which may be extended a considerable distance downwardly from the aircraft so as to act as a feeler as well as a landing gear for aiding in obtaining an easy landing;

Fourth, to provide an aircraft of this class in which movement of the landing gear as the weight of the aircraft is imposed thereon automatically shifts the tilting wing of the aircraft into its braking position so as to retard forward movement of the aircraft;

Fifth, to provide an aircraft of this class in which the landing gear though particularly adapted for operation upon ground may be effectively operated for landing the aircraft upon water, the operation of the landing gear being identical in either case;

Sixth, to provide an aircraft of this class which incorporates a novel automatic control means arranged to maintain lateral as well as longitudinal stability;

Seventh, to provide an aircraft of this class in which feeler means projecting forwardly of the sustaining or control surfaces respond to varying conditions so as to set the control surfaces accordingly by the time the control surfaces of the aircraft encounter the conditions which influence the feeler vanes;

Eighth, to provide an aircraft of this class which automatically banks when the rudder is turned, and Ninth, to provide on the whole a novelly constructed aircraft which is durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Fig. 19 is a wiring diagram of the electrically operated portions of the control mechanism.

Similar characters of reference refer to similar parts and portions throughout the several views of the drawings.

Fuselage 1, air rudder 2, water rudder 3, taxying wheel 4, stabilizers 5, elevators 6, jack means 7, elevator operating cable 8, propeller 9, deflecting or guiding vanes 10, lower wing 11, upper wing 12, struts 13, main drive shaft 14, gear housing 15, connecting shafts 16, gear means 17, engines 18, gear elements 19, propeller shafts 20, propeller shaft housings 21, propellers 21A, guide or deflecting vanes 22, cog wheel shaft 23, bracket bearings 24, cog wheels 25 and 26, rack members 27 and 28, cables 29, cable drums 30, operating shaft 31, frame elements 32, pinion gears 33, segmental gears 34, connecting rods 35, brackets 36, landing gear shaft 37, braces 38, landing members 39, main landing wheels 40, auxiliary landing wheels 41, gear segment 42, cable 43, cable drum 44, yieldable cord 45, anchor 46, dog clutch 47, lever 48, frame means 49, spring 50, gear reduction unit 51, shaft 52, control means 53, counter shaft 54, control rod 55, gear reduction unit 56, shaft 57, control mechanism 58, control rod 59, driven shaft 60, pinion gear 61, pin 62, lever 63, catch member 64, catch lever 65, leaf spring 66, roller 67, arm 68, solenoid 69, arms 70, shafts 71, feeler vanes 72, segmental pulleys 73, cables 74, pulleys 75, contact levers 76 and 77, bracket 78, rheostats 79, 80, 81 and 82, supporting arms 83 and 84, spring 85, link members 86 and 87, pendulum 88, solenoids 89, 90, 91 and 92, armatures 93 and 94, gear levers 95 and 96, shafts 97 and 98, differential gear 99, pulley wheel 100, source of electrical energy 101, hand wheels 102, shafts 103, pulley wheels 104, rudder control cables 105, levers 106, rheostats 107, 108, 109 and 110, springs 111 and 112, arms 113, link bars 114, bell cranks 115, link members 116, bell cranks 117, connecting bars 118, and ailerons 119, constitute the principal parts and portions of my novel aircraft.

A fuselage 1 forms the body of my aircraft. Its lower side is flat except for the forward portion which turns upwardly. The lower portion of the fuselage is preferably made watertight so as to facilitate landing on the water. The fuselage is provided at its rearward extremity with an air rudder 2. The lower end of the air rudder 2 pivotally supports a water rudder 3 which caps the lower end of the air rudder and is provided with a small taxying wheel 4.

The rearward extremity of the fuselage is also provided with a stabilizer 5 terminating in elevators 6. The stabilizer 5 is adapted to be adjusted by a jack means 7, while control cables 8 operating through a link member 8a operate the elevators 6.

A short distance forwardly of the stabilizer 5 the fuselage 1 is provided with a vertically disposed aperture 1a therethrough in which is mounted a propeller 9 adapted to direct an air stream over and around the stabilizers, elevators and rudders. Between the propeller 9 and stabilizers 5 is a series of deflecting vanes 10 supported at their extremities in an annular rim 10a. The deflecting vanes 10 are similar to the deflecting vanes used in conjunction with the driving propellers to be described hereinafter. The purpose of the deflecting vanes 10 is to straighten out or remove the torque from the propeller slip stream so that the slip stream can be more effectively applied to the control surfaces.

The forward portion of the fuselage is supported by a lower wing 11 and an upper wing 12. The lower wing 11 is made as sturdy as possible and is disposed with its lower side flush with the under side of the fuselage. The lower wing 11 is braced by longitudinally extending spars 11a and 11b which extend uninterrupted through the fuselage. The upper wing 12 is likewise provided with spars, designated 12a and 12b.

The upper wing 12 is rotatably supported with respect to the fuselage and is supported from the lower wing 11 by means of struts 13 which form housings for the tilting mechanism of the upper wing 12. The upper wing is rotatable upon a shaft 14 which forms the main drive shaft for the driving propellers of the aircraft.

The main drive shaft 14 extends from each portion of the upper wing into the fuselage 1 and into a suitable gear casing 15, which in turn is connected through connecting shafts 16 and gear means 17 to engines 18 mounted within the fuselage.

Above each strut 13 the main drive shaft 14 is connected through a gear element 19 to a propeller shaft 20. Each propeller shaft 20 is mounted within a housing 21 which extends forwardly from the gear elements 19 past the leading edge of the upper wing 12. The forward edge of each propeller shaft 20 supports a propeller 21A. The gear elements 19 and propeller shaft housings 21 are mounted within pockets or recesses 12c provided at the under side of the wing 12.

In the structure shown two propellers are provided for each extended portion of the upper wing 12. The housings 21 for each pair of propeller shafts support a plurality of guide or deflecting vanes 22 which are tied together at their extremities and intermediate their ends by webs 22a. The guide vanes 22 are arranged to remove or straighten out the torque normally occurring in propeller slip streams, thus providing a smooth unturbulated flow over the upper wing 12.

The propellers and guide vanes are adapted to remain fixed during the initial tilting movement of the wing 12 until said wing reaches a predetermined tilted position, whereupon the propellers and guide vanes shift with the wing. This movement is accomplished as follows: A shaft 23 extends along the wing 12 forwardly of the front spar 12a and is supported therefrom by means of bracket bearings 24. Within the fuselage the shaft 23 is provided with a cog wheel 25, and over each propeller shaft housing the shaft 23 is provided with cog wheels 26. Within the fuselage there is provided an upwardly directed arcuate rack member 27 which is secured at its lower end to a frame member 1b forming a part of the fuselage 1. The lower portion of the rack 27 is provided with teeth 27a, while the upper portion continuing therefrom is smooth faced, as indicated at 27b. The upper extremity of the rack terminates in a stop 27c. The teeth of the cog wheel 25 are interrupted by a lug member or portion 25a which is provided with a flat surface adapted to ride upon the smooth surface 27b of the rack. The lug 25a is so positioned that when the cog wheel has rotated upwardly to the extremity of the rack teeth, said lug engages the smooth portion 27b, whereupon the cog wheel 25 is held against rotation during the remaining movement to the extremity of the rack member. On return movement of the cog wheel 25 from the extremity of the rack 27, the side of the lug 25a engages a shoulder or boss 27d formed at the side of the rack 27 and arranged to rotate the cog wheel so that the teeth thereof engage the teeth of the rack.

The cog wheels 26, one above each propeller shaft housing, engage a rack member 28 supported from said housing and extending upwardly therefrom. The lower portion of the rack 28 is provided with teeth 28a which coact with those of the cog wheel 26. Each rack 28 is provided with a suitable stop 28b at its upper extremity which coacts with a lug 26a formed on the corresponding cog wheel 26 and interrupting the teeth thereof. The racks 28 are somewhat less in extent than the rack 27. In fact the relative lengths are such that when the cog wheels 26 reach the extremity of their movement the cog wheel 25 has reached the extremity of its rotary movement and from then on slides on the rack. The adjustment of the propeller shaft housing and the propeller and guide vanes carried thereby with respect to the upper wing 12 is obtained automatically with the tilting of the wing.

Figure 1:
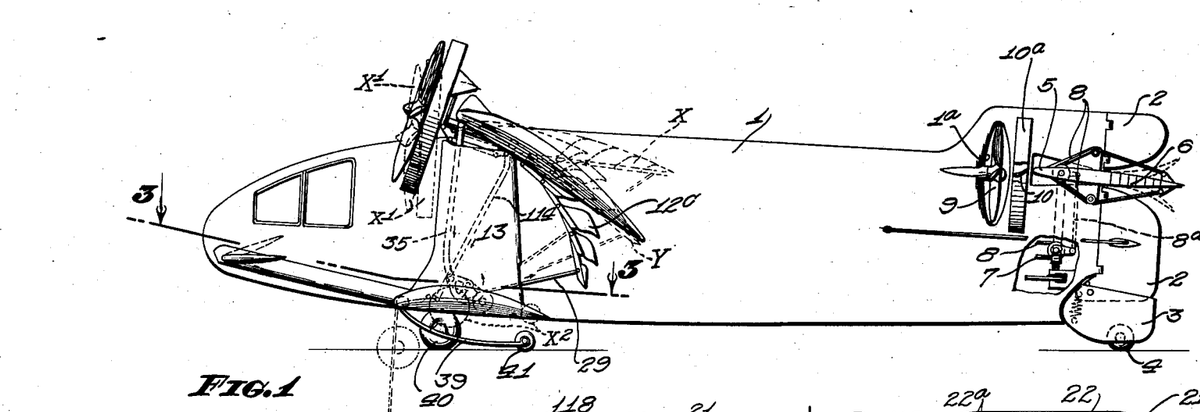
Figure 1 is a side elevational view of my novel aircraft, showing the main wings and propellers in the positions assumed when landing and when in flight.
Figure 2:
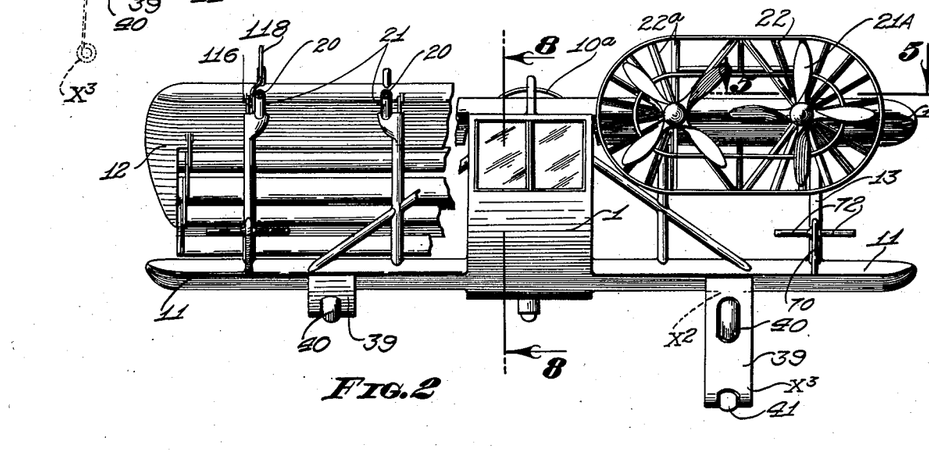
Fig. 2 is a front elevational view thereof showing one side of the aircraft as it appears when in flight and the other side thereof as it appears when landing, parts and portions being broken away and in section to facilitate the illustration.
Figure 3:
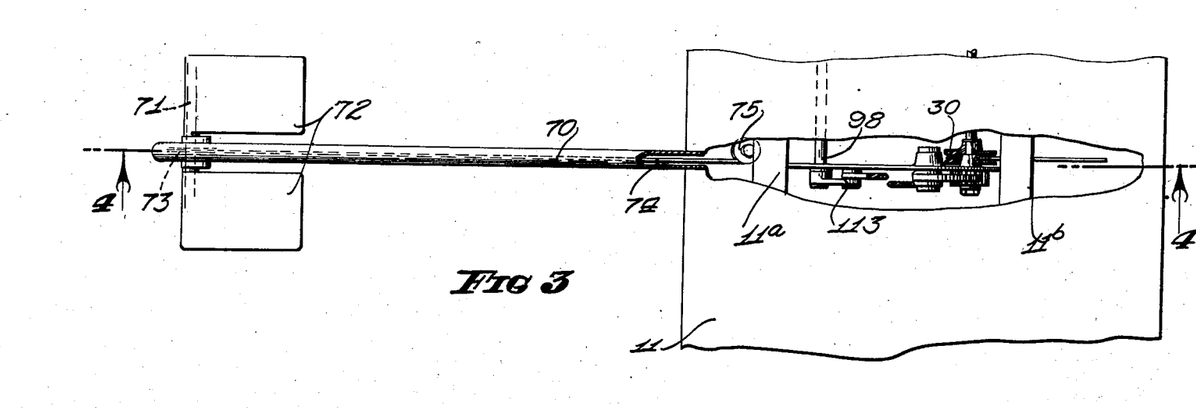
Fig. 3 is a fragmentary sectional view through 3—3 of Fig. 1 showing the arrangement of the feeler vanes with respect to the wing.
Figure 4:
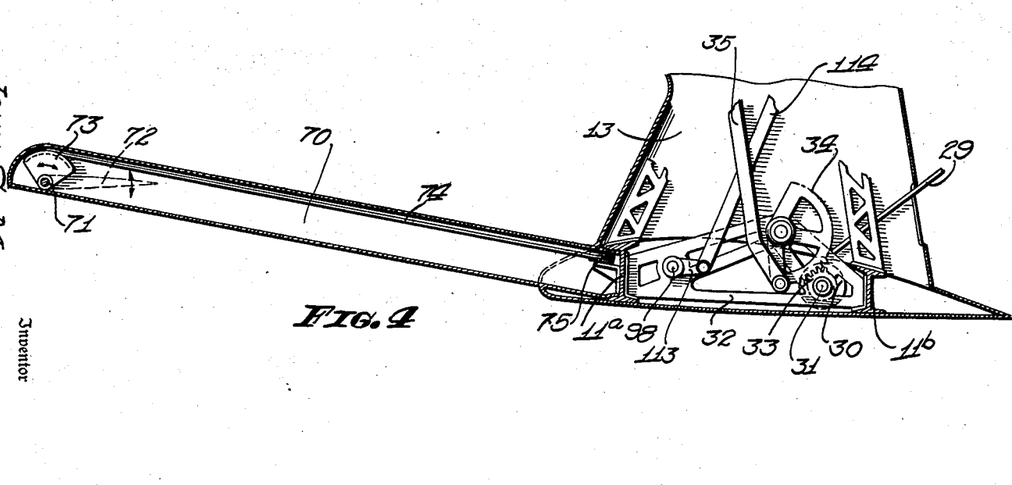
Fig. 4 is a sectional view thereof through 4—4 of Fig. 3 with parts and portions shown in elevation.
Figures 5, 6, 7:
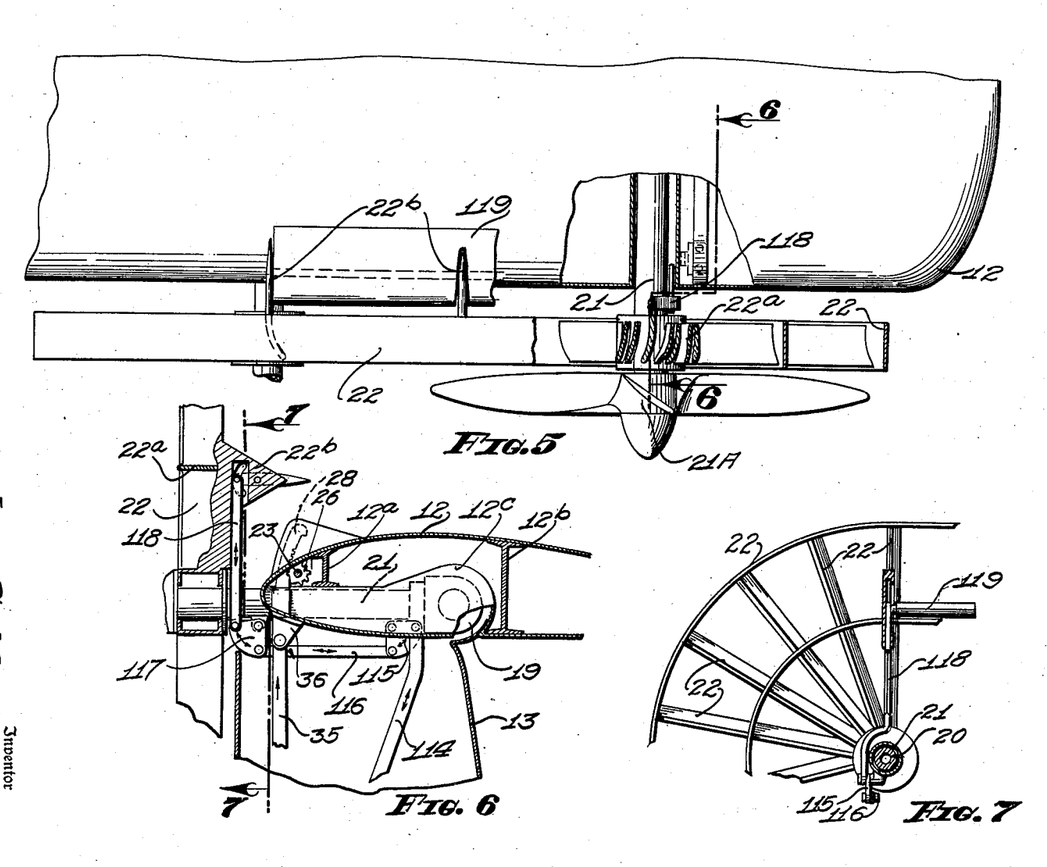
Fig. 5 is an enlarged fragmentary sectional view through 5—5 of Fig. 2 with parts and portions shown in elevation.
Fig. 6 is a fragmentary sectional view through 6—6 of Fig. 5 with parts and portions shown in elevation.
Fig. 7 is a sectional view through 7—7 of Fig. 6.

The rear portion of the upper wing 12 is of a slotted airfoil construction comprising a plurality of air foil segments 12d which are adapted to be drawn downwardly and forwardly by means of cables 29. The cables 29 are located rearwardly of the struts 13 and extend forwardly and within said struts so as to wrap around cable drums 30, as shown best in Figs. 3 and 4. The cable drums 30 are mounted on a common operating shaft 31 extending longitudinally through the lower wing 11 and through the fuselage 1. Within and below each strut the operating shaft 31 is supported by a frame element 32. Also mounted upon the operating shaft 31 adjacent each frame element 32 is a pinion gear 33 which engages a segmental gear 34 supported from the corresponding frame element 32. The segmental gear 34 forms a crank member which is joined to one end of a link 35 the other end of which is connected by a bracket 36 to the forward or leading edge of the upper wing 12, as shown best in Figs. 1, 5 and 6. With this arrangement, rotation of the shaft 31 in a counterclockwise direction, as viewed in Fig. 4, produces an upward thrust on the leading edge of the upper wing 12 and pulls downwardly upon the airfoil segments or trailing portion of the wing 12.

The lower wing 11 is provided at its forward portion with a relatively large landing gear shaft 37 which extends out either portion of the lower wing to points approximately midway between the two struts 13 at each side of the fuselage. At these portions the lower wing is joined to diagonal braces 38 which extend upwardly to the fuselage. Each extremity of the landing gear shaft 37 is provided with a landing member 39 which is in the form of a flat relatively broad strip approximately equal in length to the width of the wing 11 and is preferably formed of spring material. Near its forward portion each landing member 39 is provided with a main landing wheel 40 the axis of which is slightly above the under surface of the landing member, the main landing wheel being disposed so as to extend through a slot 39a formed in said landing member. The rear or extended end of each landing member is bifurcated and receives an auxiliary landing wheel 41.

The landing gear shaft 37 extends through the fuselage 1. Within the fuselage said shaft is provided with a gear segment 42. The gear segment 42 is provided at one side adjacent its periphery with an arcuate cable pulley portion 42a. The gear segment and cable pulley are disposed so as to rotate in an arc from one side to the other but above the landing gear shaft 37. A cable 43 is attached by one end to the forward extremity of the arcuate cable pulley 42a and extends rearwardly therefrom to a cable drum 44 mounted upon the operating shaft 31 of the wing tilting mechanism. The cable drum 44 also receives a yieldable cable or cord 45 such as the conventional shock cord used in the conventional landing gear. The yieldable cord 45 extends upwardly and forwardly from the drum to a suitable anchor 46 supported from the frame work of the fuselage 1.

Figure 11:
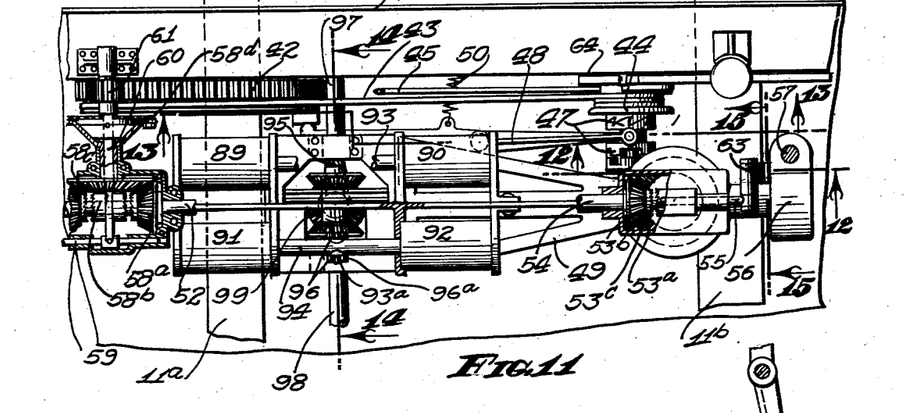
Fig. 11 is a fragmentary plan view of the control mechanism taken through 11—11 of Fig. 8.
Figure 14:
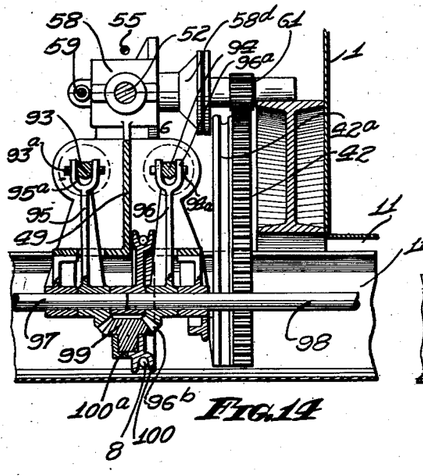
Fig. 14 is a transverse sectional view thereof through 14—14 of Fig. 11.

The cable drum 44 is normally rotatably mounted upon the shaft 31 but may be joined thereto by a sliding double-ended dog clutch 47 mounted upon the shaft 31. The dog clutch 47 is operated by a lever 48 which extends forwardly from the shaft 31 and is pivotally mounted in a horizontal plane by a bracket bearing 49a extending from a frame means 49 supported between the spars 11a and 11b. The forward end of the lever 48 is adapted to engage a cam 42b formed at the side of the segmental gear 42 at the rearwardly directed extremity thereof, as shown best in Figs. 11, 13 and 14. A spring 50 is connected to the lever 48 in such a manner as to normally hold the clutch 47 clear of the drum 44, the cam 42b acting against the spring 50 to shift the clutch into engagement with the cable drum.

The wing tilting operating shaft 31 extends through a gear reduction unit 51 which is adapted to be operatively connected therewith through the clutch 47, said clutch being engageable with the gear reduction unit or with the cable drum 44. The clutch 47 is normally in engagement with the gear reduction unit so that at all times, except when the landing gear is hanging downwardly prior to landing, the tilting of the wing is controlled through the gear reduction unit 51. A shaft 52 extends upwardly from the gear reduction unit into a control means 53 comprising a driven bevel gear 53a mounted on the shaft 52 and a pair of driving bevel pinion gears 53b mounted on a horizontally extending countershaft 54. The bevel pinion gears 53b are loosely mounted upon the shaft 54 and are adapted to be operatively connected therewith by means of a clutch member 53c mounted between the pinion gears 53b and provided with clutch faces so that either one or the other of the pinion gears may be connected. The clutch 53c is shifted by an operating rod 55 which extends to the driver's compartment of the aircraft. The countershaft 54 is connected through a gear reduction unit 56 to a vertically disposed shaft 57 which extends into one of the gear means 17 and joins directly to the shaft 16.

The control means 53 and gear reduction units 51 and 56 all may be supported from the frame means 49. The frame means 49 extends between the spars 11a and 11b and supports the forementioned elements adjacent and over the rear spar 11b. The forward portion of the frame means 49 supports a control mechanism 58 which is similar to the control means 53. Thus the control mechanism 58 comprises a pair of pinion bevel gears 58a mounted on the countershaft 54 and adapted to be connected thereto by a double-ended clutch member 58b which is operated by a control rod 59 extending to the driver's compartment of the aircraft. The bevel pinion gears 58a engage a driven gear 58c which is mounted upon a driven shaft 60. The driven shaft 60 extends over the segmental gear 42 and is provided with a pinion gear 61 which engages said segmental gear. In order to prevent breakage should the movement of the segmental gear 42 or the tilting of the wing 12 be impeded, the control mechanism 58 and control means 53 are provided with suitable friction means 58d and 53d, respectively, which connect the gears 58c and 53a with their respective shafts.

In order to prevent tilting of the wings beyond a predetermined angle while in flight, an automatic means is provided for shifting the clutch 53c of the control unit 53 into a neutral position. For this purpose the clutch element, designated 51a, which connects the gear reduction unit 51 with the clutch 47 is provided with a lug 51b which after turning a predetermined distance engages a pin 62. The pin 62 is supported from the rear lower spar 11b and engages the lower arm 63a of a lever 63, as shown best in Figs. 11, 12 and 15. The upper arm, designated 63b, of the lever is joined to the rear extremity of the control rod 55, hence when the wing has been tilted a predetermined distance the lever 63 shifts the clutch 53c to its neutral position.

Figures 12, 13:
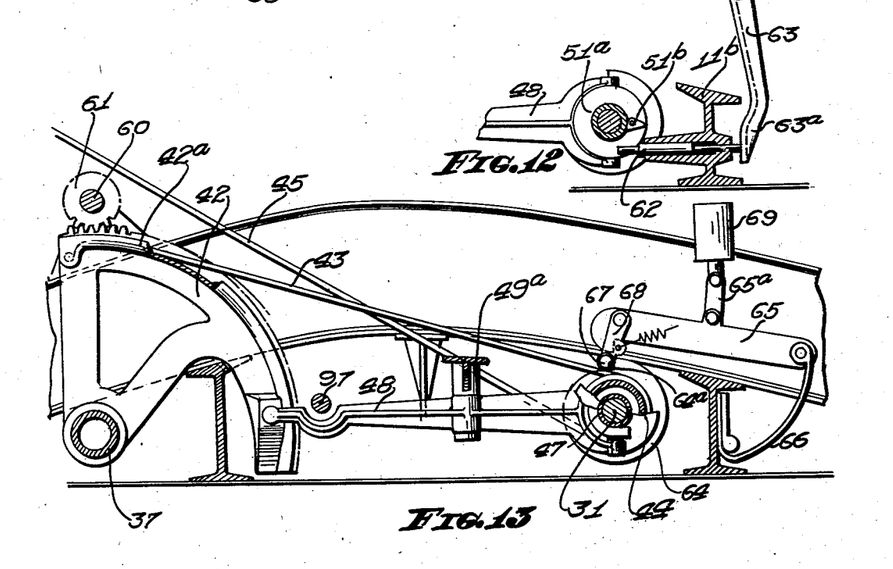
Fig. 12 is a fragmentary sectional view thereof through 12—12 of Fig. 11.
Fig. 13 is another fragmentary sectional view thereof through 13—13 of Fig. 11.
Figure 15:
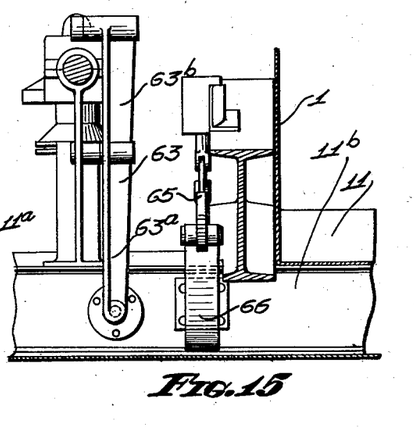
Fig. 15 is a fragmentary sectional view through 15—15 of Fig. 11.
Figures 17, 18:
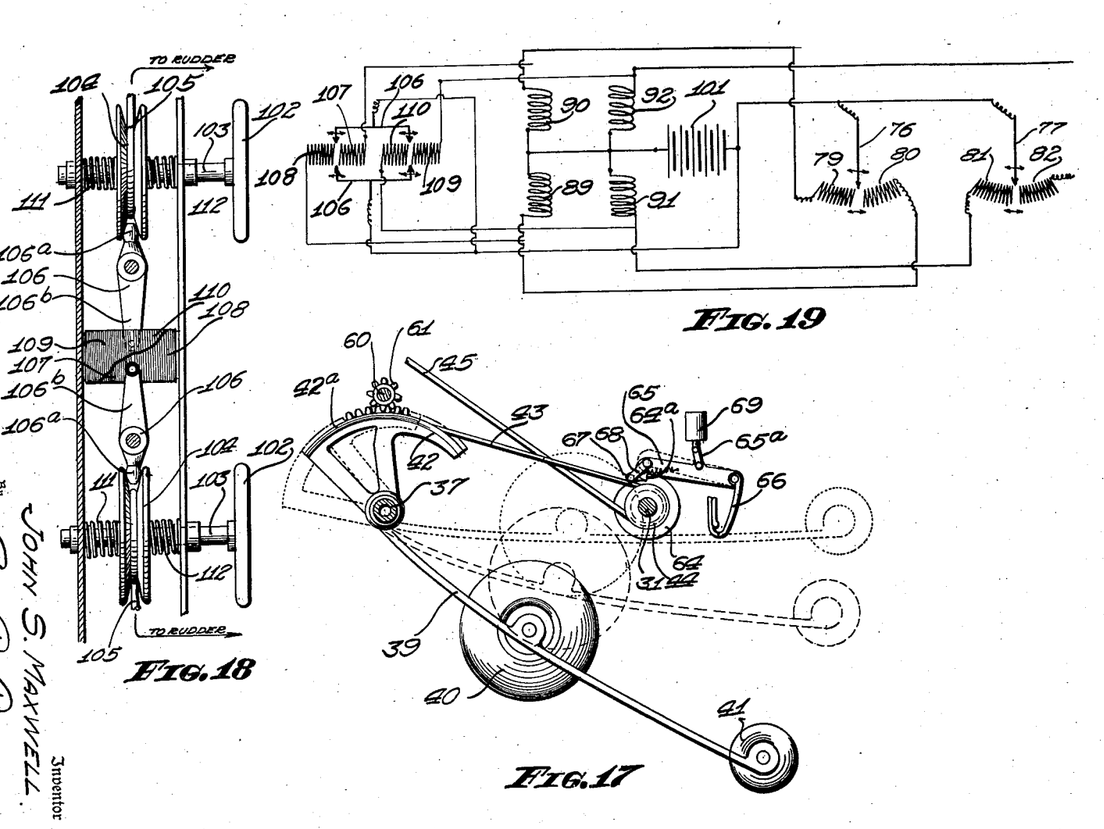
Fig. 17 is a composite substantially diagrammatical view of the landing gear and its operating mechanism illustrating their manner of operation.
Fig. 18 is a fragmentary sectional view through 18—18 of Fig. 8 showing the manual control mechanism.

With reference again to the landing mechanism or landing gear, the yieldable cord 45 serves to rotate the drum 44 as the cable is fed to it. During the initial movement of the landing members 39, resistance is offered by the tilting wing and its operating mechanism. The remaining movement is accomplished by the landing members inasmuch as these members are yieldable. With reference particularly to Figs. 13 and 15, it will be noted that one end of the cable drum 44 is provided with a catch member 64 in the form of a disk having a notch 64a in its periphery. The catch member 64 is adapted to coact with a catch arm 65 which is supported from the spar 11b by means of a sturdy leaf spring 66. The catch member 64 and catch lever 65 are adapted to engage each other when the catch member and drum are rotated in a counterclockwise direction, as viewed in Figs. 13 and 17. Inasmuch as the cable drum 44 is adapted to turn more than a full revolution and it is desired to have the catch member and catch lever coact after a full turn has been completed, there is provided a roller 67 which rides upon the catch member and is supported from the catch lever 65 by an arm 68 in such a manner that when the cable drum 44 turns counterclockwise the catch lever is held clear of the catch member by the roller 67 until tripped by the notch 64a. In order to shift the catch lever 65 clear of the catch member 64, as when shifting the landing gear into its retracted position, the catch lever is provided with an upwardly directed arm 65a which incorporates a link member and forms an armature at its extended end adapted to coact with a solenoid coil 69 controlled from the driver's compartment.

With reference now to Figs. 1, 2, 3 and 4 in particular, opposite the outermost strut 13 on either side of the fuselage 1 and supported from the forward spar 11a of the lower wing 11 is a forwardly and slightly upwardly directed arm 70 which is hollow. The extended portion of the arm 70 supports a transversely extending horizontally disposed shaft 71 which supports on either side of the hollow arm a feeler vane 72. The pair of feelers associated with each arm 70 have airfoil sections and extend backwardly from the shaft 71. Within the arm 70 each shaft 71 is provided with a segmental pulley 73 to which is attached one end of a cable 74. The cable 74 from each arm 70 extends rearwardly to the forward spar 11a and around a pulley 75 supported from said spar.

Figures 8, 9, 10:
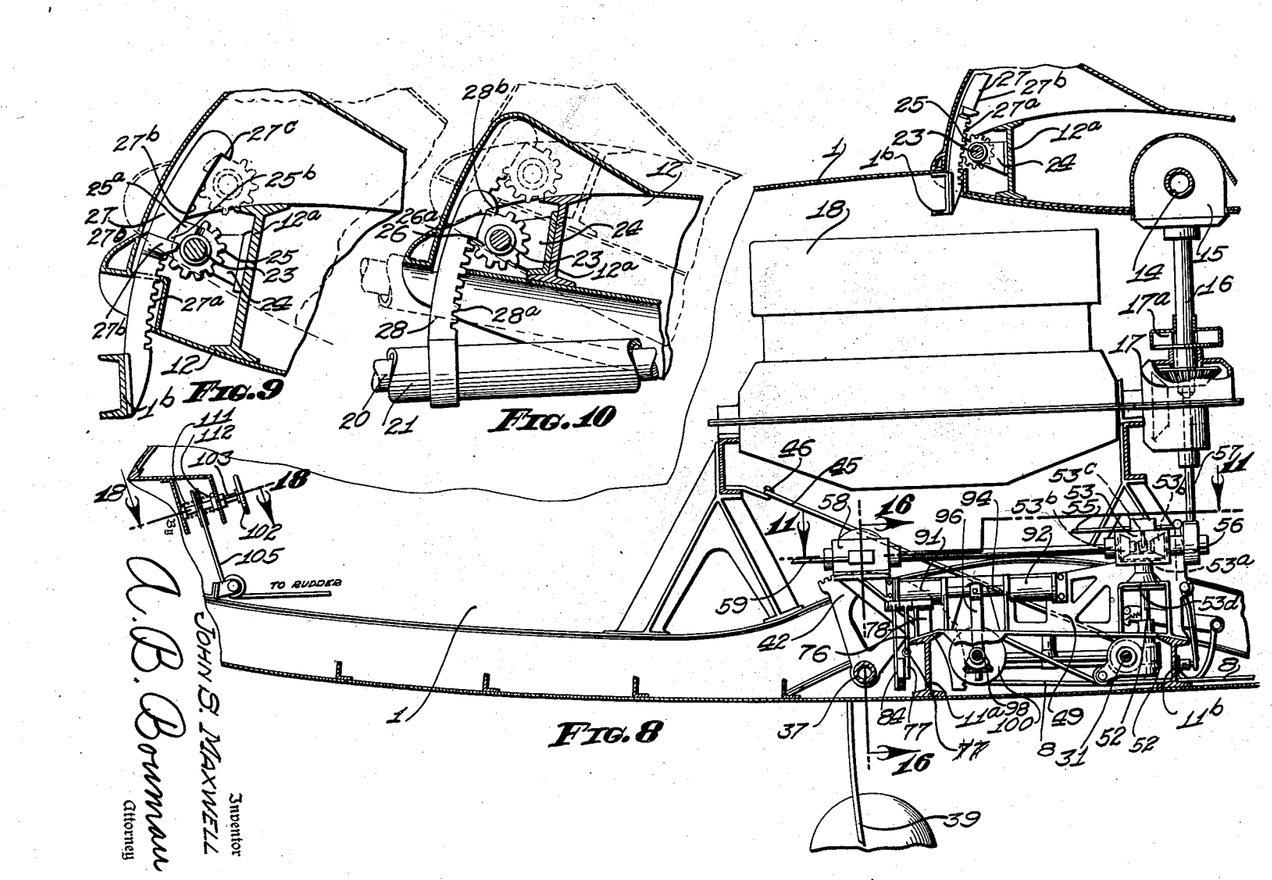
Fig. 8 is a longitudinal sectional view of the fuselage of my aircraft taken substantially through 8—8 of Fig. 2 with parts and portions shown in elevation.
Fig. 9 is an enlarged fragmentary sectional view of the leading edge of the wing at its central portion showing a part of its tilting mechanism in its various shifted positions.
Fig. 10 is a similar sectional view taken substantially at the axis of one of the propeller shafts, also showing the several positions assumed when the wing is tilted.
Figure 16:
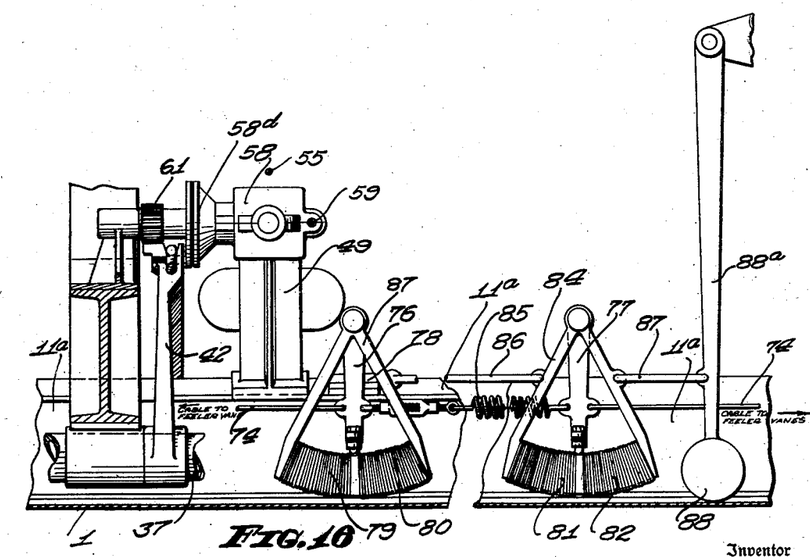
Fig. 16 is a sectional view thereof through 16—16 of Fig. 8.

Each cable 74 extends inwardly towards and into the fuselage 1. These cables are joined to contact arms 76 and 77, one contact arm for each cable, the contact arm 76 being connected with the lefthand cable, as viewed from the front of the aircraft. The contact arms 76 and 77 are supported from suitable bracket bearings 78 secured to the forward spar 11a, as shown in Figs. 8 and 16. The contact levers 76 and 77 depend from their supports and coact with pairs of rheostats. The rheostats associated with the contact lever 76 are designated 79 and 80, while the rheostats associated with the lever 77 are designated 81 and 82. The rheostats 79 and 80 are disposed in a common arc and are supported by arms 83 pivoted on the same axis with the contact lever 76. Similarly the rheostats 81 and 82 are supported by arms 84 from the axis of the contact lever 77. In order to connect the movements of the contact arms 76 and 77 a spring 85 is provided which extends therebetween. The arms 83 and 84 which support the rheostats are joined together by a link member 86. One of the arms is connected through a link member 87 with the shank 88a of a pendulum 88.

The frame means 49 supports at its upper forward portion four solenoids 89, 90, 91 and 92 arranged in pairs. Each pair of solenoids is disposed along a common horizontal axis. The pair of solenoids 89 and 90 receive the ends of a double-ended armature 93. The solenoids 91 and 92 similarly receive a double-ended armature 94. The armatures 93 and 94 are arranged in parallel disposed relation and are shown best in Figs. 8, 11 and 14. The central portions of the armatures 93 and 94 are provided with pins 93a and 94a, respectively, which engage the forked upper extremities 95a and 96a of gear levers 95 and 96, respectively. The gear levers 95 and 96 are secured to shafts 97 and 98 which abut each other at their inner ends and extend outwardly in axial alinement into the lower wing 11 and are supported from the forward spar 11a by suitable bearings. Below the shafts 97 and 98 the gear levers 95 and 96 are provided with segmental gear portions 95b and 96b which engage a common differential gear 99.

The differential gear 99 is journalled in a bearing 100a formed in a pulley wheel 100. The pulley wheel 100 is journalled on the abutting ends of the shafts 97 and 98. The differential gear 99 is so arranged that rotation of the gear levers 95 and 96 in the same direction causes rotation of the pulley wheel 100, whereas rotation of the gear levers in opposite direction merely turns the differential gear. The pulley wheel 100 receives the cable 8 which controls the elevators 6.

The solenoids 89 and 90 are connected respectively with the rheostats 79 and 80, while the solenoids 91 and 92 are connected with the rheostats 81 and 82, respectively, as shown best in the diagrammatical view Fig. 19. The solenoids and contact arms 76 and 77 are also connected to a suitable source of electrical energy, designated 101.

The air rudder 2 and the water rudder 3 which is carried thereby are controlled by hand wheels 102 which are mounted in the driver's compartment upon shafts 103 and which carry pulley wheels 104. Cables 105 connect the pulley wheels 104 with the rudders, thus providing a dual control therefor. The pulleys 104 have relatively deep grooves 104a which provide side walls extending beyond the cables 105. These side walls are adapted to engage arm portions 106a of levers 106 the opposite ends of which are provided with contact arms 106b adapted to coact simultaneously with a pair of rheostats 107 and 109, or with a pair of rheostats 108 and 110. The rheostats 107 and 109 control the solenoids 90 and 92 so as to operate both the ailerons, to be described hereinafter, and the elevator and nose the airplane up. The rheostats 108 and 110 are similarly connected to the solenoids 89 and 91 and operate both ailerons and the elevator to nose the airplane down. The shafts 103 are adapted to be shifted inwardly and outwardly so as to move the levers 106 and thereby influence the solenoid coils 109 and 110. The shafts 103 are normally held in their central position by means of springs 111 and 112.

With reference particularly to Figs. 1, 4, 5, 6 and 7, it will be noted that the shafts 97 and 98 are provided opposite each strut 13 with a lever arm 113. The extended end of each arm 113 is connected to a link bar 114 which extends upwardly within the corresponding strut 13 to a point adjacent the propeller shaft housing 21 and joins a bell crank 115 supported from said housing 21. The bell crank 115 is connected through a link 116 to a second bell crank 117 mounted at the forward portion of the housing 21 immediately rearwardly of the guide vanes 22. The bell crank 117 is connected to an upwardly directed connecting bar 118 which curves to clear the housing 21 and extends upwardly therefrom in alinement with one of the deflecting vanes 22. The upper end of the connecting bar 118 extends into a suitable housing 22b formed at the rear side of one of the vanes 22 and is adapted to join an aileron 119 pivotally supported between said housings 22b, said housings forming supporting brackets therefor. The ailerons are so connected with the feeler vanes 72 that they are operated to counteract the condition disclosed by said feeler vanes.

Operation of my aircraft is as follows: The propellers 21A and deflector or guide vanes 22 maintain an air stream which acts upon the upper or main wing 12 independently of the forward movement of the aircraft in the air or on the ground, thus greatly facilitating landing or taking off. Similarly the auxiliary propeller 9 and guide or deflecting vanes 10 maintain a smooth air flow over the stabilizer 5 and elevators 6 as well as the rudders 2. In normal flight the upper wing 12 occupies the dotted line position, shown in Fig. 1, designated X, which is also the position shown at the righthand portion of Fig. 2. When the wing is in this position the propellers 21A and deflector vanes 22 occupy the dotted line position, designated X1, in Fig. 1 which is the position shown at the righthand of Fig. 2 and the position shown in Fig. 6. While the propellers and deflector vanes occupy this position the wing 12 is free to tilt to the dotted line position designated Y in Fig. 1, this movement being accomplished by the control rod 55 which shifts the clutch 53c into engagement with one or the other of the pinion gears 53b. When the aircraft is in flight the landing members 39 occupy the dotted line position designated X2 in Figs. 1 and 2. However, the landing members are free to swing to the position designated X3 without shifting the wing 12 by reason of the fact that during such movement the clutch 47 is not engaged with the drum 44. This movement of the landing members is accomplished by operation of the control rod 59 associated with the control mechanism 58. When it is desired to land the aircraft, or as a precaution when flying blind and a forced landing may be necessary, the pilot first tilts the wing 12 to the position Y which permits slower speed by increasing the lift, then the landing members are dropped to the position designated X3 in Figs. 1 and 2, whereupon the auxiliary landing wheels 41 first engage the ground and shift the landing members backwardly towards a position intermediate positions X2 and X3. This movement of the landing members causes the wing 12 to be tilted from position Y to the position shown in full lines in Fig. 1, so as to brake the forward movement of the aircraft. It will be noted that the arrangement of the connection between the clutch 47 and the drum 44 prevents disengagement as long as tension is applied to the clutch through the drum 44. At other times when the wing tilting mechanism is operated through the control means 53, the tilting movement of the wing is confined between the two positions designated X and Y in Fig. 1.

The feeler vanes 72 on either side of the fuselage operate either in opposed direction or in unison. When both sets of feeler vanes tilt upwardly, that is, when their rearward extended ends tilt upwardly, the two cables 74 are pulled in opposite direction against the action of the spring 85 causing the contact arms 76 and 77 to influence the rheostats 79 and 82 thereby causing the solenoids 89 and 92 to operate in unison and thereby influence the ailerons and elevators in a direction necessary to counteract the condition influencing the feeler vanes. Similarly, downward movement of the feeler vanes in unison cause the contact arms 76 and 77 to move towards each other and thereby influence the solenoids 90 and 91 through the rheostats 80 and 81. Conditions which cause opposed movement of the two sets of feeler vanes cause the contact arms 76 and 77 to rotate in the same direction, thus influencing the solenoids so as to shift their armatures in opposite directions and thereby turn the shafts 97 and 98 so as to shift the ailerons into positions proper for counteracting the influence upon the feeler vanes. This action of the feeler vanes is enhanced whenever the aircraft is tilted to one side or the other by means of the pendulum 88. The pendulum's main function however, is to control the ailerons when the rudder 2 is turned, the pendulum being thrown to the side necessary to set the ailerons in position for proper banking of the aircraft.

Overriding clutches 17a connect each engine 18 with its shaft 16. This arrangement prevents a drag on the driving shafts should one engine cease to operate. Also, the overriding clutches permit control of the tilting wing 12 even though both or all of the engines should fail, inasmuch as the airflow tends to maintain rotation of the propellers, and the shaft 57 is connected directly to one of the shafts 16.

When landing on water, the landing members on striking the water operate the tilting wing 12 in the same manner as when landing on ground.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. An aircraft including, a fuselage, a tiltable wing extending therefrom, propellers carried by said wing and disposed forwardly thereof, whereby the slipstream therefrom passes over and around said wing, and guide vanes disposed between said propellers and said wing for counteracting the twisting action of the slipstreams of said propellers.

2. An aircraft including, a fuselage, a tiltable wing extending therefrom, propellers carried by said wing and disposed forwardly thereof, whereby the slipstream therefrom passes over and around said wing, guide vanes disposed between said propellers and said wing for counteracting the twisting action of the slipstreams of said propellers, an operating mechanism for said tiltable wing, a control means for said operating mechanism, a landing mechanism arranged to yield upon landing, and means connecting said landing mechanism with said operating mechanism whereby movement of said landing mechanism when landing causes said wing to tilt.

3. An aircraft including, a fuselage, a tiltable wing extending therefrom, propellers carried by said wing and disposed forwardly thereof, whereby the slipstream therefrom passes over and around said wing, guide vanes disposed between said propellers and said wing for counteracting the twisting action of the slipstreams of said propellers, an operating mechanism for said tiltable wing, a control means for said operating mechanism, a landing mechanism arranged to yield upon landing, means connecting said landing mechanism with said operating mechanism whereby movement of said landing mechanism when landing causes said wing to tilt, and a shiftable connecting means joining said wing and said propellers arranged to permit a predetermined tilting movement of said wing relative to said propellers whereupon said propellers shift with said wing.

4. An aircraft including, a tiltable wing, propellers supported therefrom and arranged to direct their airstreams over and around said wing, a connecting means arranged to permit limited tilting movement of said wing with respect to said propellers, said propellers thereupon being shiftable with said wing, a shiftable landing mechanism arranged to yield when landing, and operating means connecting said landing mechanism with said wing whereby movement of said landing mechanism when landing tilts said wing and propellers.

5. An aircraft including, a tiltable wing, propellers supported therefrom and arranged to direct their airstreams over and around said wing, a connecting means arranged to permit limited tilting movement of said wing with respect to said propellers, said propellers thereupon being shiftable with said wing, an operating mechanism for tilting said wing, a control means therefor including an element confining the tilting of said wing substantially to the limits of said connecting means, a landing mechanism arranged to shift upon landing, a connecting means joining said landing mechanism with said tiltable wing whereby movement of said landing mechanism upon landing tends to tilt said wing, and a clutch means arranged to join either said control means or said connecting means with said wing.

6. An aircraft including, a tiltable wing, an operating mechanism for tilting said wing, a control means therefor, a landing mechanism arranged to shift from an extended towards a retracted position when landing, a connecting means for linking said landing mechanism with said operating mechanism, and a clutch arranged to join said connecting means or said control means with said operating mechanism.

7. In an aircraft, a fuselage, a lower fixed wing, an upper tiltable wing, struts connecting said wings, an operating mechanism for said tiltable wing extending from said fuselage through said fixed wing and from said struts to said tiltable wing, propeller shafts and housing therefor supported from said tiltable wing disposed forwardly thereof, guide vanes supported from said housings between said propellers and said tiltable wing, a control means for said operating mechanism, a landing mechanism arranged to shift from an extended towards a retracted position when landing, a connecting means for linking said landing mechanism with said operating mechanism, and a clutch arranged to join said connecting means or said control means with said operating mechanism.

8. In an aircraft, a fuselage, a lower fixed wing, an upper tiltable wing shiftable from a position suitable for normal flight through a position of maximum lift to a braking position, struts connecting said wings, an operating mechanism for said tiltable wing extending from said fuselage through said fixed wing and from said struts to said tiltable wing, propeller shafts and housings therefor supported from said tiltable wing disposed forwardly thereof, guide vanes supported from said housing between said propellers and said tiltable wing, a first control means operable while in flight arranged to actuate said operating mechanism so as to shift said wing from its normal approximately to its position of maximum lift, and a second control means operable when landing arranged to actuate said operating mechanism so as to shift said wing to its braking position.

9. In an aircraft, a fuselage, a lower fixed wing, an upper tiltable wing shiftable from a position suitable for normal flight through a position of maximum lift to a braking position, struts connecting said wings, an operating mechanism for said tiltable wing extending from said fuselage through said fixed wing and from said struts to said tiltable wing, propeller shafts and housings therefor supported from said tiltable wing disposed forwardly thereof, guide vanes supported from said housings between said propellers and said tiltable wing, a first control means operable while in flight arranged to actuate said operating mechanism so as to shift said wing from its normal approximately to its position of maximum lift, a landing mechanism arranged to shift from an extended towards a retracted position when landing, and a second control operable by said landing mechanism arranged to actuate said operating mechanism so as to shift said wing to its braking position.

10. An aircraft including, a tiltable wing, a plurality of propellers carried thereby and extending forwardly thereof, sets of guide vanes disposed between said propellers and wing arranged to counteract the torque of the slipstreams from said propellers and cause a relatively smooth air flow over and around said wing, and ailerons carried by said sets of guide vanes.

11. An aircraft including, a tiltable wing, a plurality of propellers carried thereby and extending forwardly thereof, sets of guide vanes disposed between said propellers and wing arranged to counteract the torque of the slipstreams from said propellers and cause a relatively smooth air flow over and around said wing, ailerons carried by said sets of guide vanes, feeler vanes mounted in advance of said wing, and a control means for said ailerons responsive to movement of said feeler vanes.

12. In an aircraft, a fuselage, control surfaces therefor including elevators, and ailerons, feeler vanes disposed forwardly of said control surfaces, on either side of said fuselage, rheostat means operable by said feeler vanes, solenoids responsive to said rheostat means, a control element connected with said elevators, a control means connected with said ailerons, and mechanism operable by said solenoids and common to said control element and control means for causing movement of said ailerons and elevators in response to movement of said feeler vanes.

13. In an aircraft, a fuselage, a fixed lower wing, an upper tiltable wing, a plurality of hinged airfoil sections composing the rear portion of said tiltable wing, said hinged sections arranged to nest together so as to form a normal wing outline and also arranged to be pulled down when said wing is being tilted so as to form a slot between each section and the one next in front of it, struts connecting said wings, an operating mechanism for said tiltable wing extending from said fuselage through said fixed wing and said struts to said tiltable wing, said operating mechanism arranged to push up the front of said tiltable wing and at the same time pull down said hinged sections.

14. In an aircraft, a fuselage, a lower fixed wing, an upper tiltable wing shiftable from a position suitable for normal flight through a position of maximum lift to a braking position, struts connecting said wings, an operating mechanism for said tiltable wing extending from said fuselage through said fixed wing and from said struts to said tiltable wing, a first control means operable while in flight arranged to actuate said operating mechanism so as to shift said wing from its normal approximately to its position of maximum lift, and a second control means operable when landing arranged to actuate said operating mechanism so as to shift said wing to its braking position.

15. In an aircraft, a fuselage, a lower fixed wing, an upper tiltable wing shiftable from a position suitable for normal flight through a position of maximum lift to a braking position, struts connecting said wings, an operating mechanism for said tiltable wing extending from said fuselage through said fixed wing and from said struts to said tiltable wing, a first control means operable while in flight arranged to actuate said operating mechanism so as to shift said wing from its normal approximately to its position of maximum lift, a landing mechanism arranged to shift from an extended towards a retracted position when landing, and a second control operable by said landing mechanism arranged to actuate said operating mechanism so as to shift said wing to its braking position.

16. In an aircraft, a fuselage, a lower fixed wing, an upper tiltable wing shiftable from a position suitable for normal flight through a position of maximum lift to a braking position, struts connecting said wings, an operating mechanism for said tiltable wing extending from said fuselage through said fixed wing and from said struts to said tiltable wing, a control means for said operating mechanism, a landing mechanism arranged to yield upon landing, and means connecting said landing mechanism with said operating mechanism whereby movement of said landing mechanism when landing causes said wing to tilt.

17. In an aircraft, a fuselage, a fixed lower wing, an upper tiltable wing, a plurality of hinged airfoil sections composing the rear portion of said tiltable wing, said hinged sections arranged to nest together so as to form a normal wing outline and also arranged to be pulled down when said wing is being tilted so as to form a slot between each section and the one next in front of it, struts connecting said wings, an operating mechanism for said tiltable wing extending from said fuselage through said fixed wing and said struts to said tiltable wing, said operating mechanism arranged to push up the front of said tiltable wing and at the same time pull down said hinged sections, and a shiftable landing mechanism arranged to yield when landing, an operating means connecting said landing mechanism with said tiltable wing whereby movement of said landing mechanism when landing tilts said wing and opens said hinged airfoil sections to their maximum angle positions.

18. In an aircraft, a fuselage, a tiltable wing mounted thereon consisting of a plurality of hinged airfoil sections forming the rear portion of said wing, said hinged sections arranged to nest together so as to form a normal wing and also arranged to be pulled down to increase the camber of said wing, and operating mechanism in connection with said wing and said hinged sections, said operating mechanism arranged to tilt said wing and at the same time operate said hinged sections so as to change the camber of said wing.

JOHN S. MAXWELL.